United States Patent [19]

Richter et al.

[11] 4,367,653

[45] Jan. 11, 1983

[54] DEVICE FOR MEASURING SOLIDS IN A MOVING STREAM

[75] Inventors: Hans-Hugo Richter; Fritz-Dieter Trumper, both of Dortmund, Fed. Rep. of Germany

[73] Assignee: Uhde GmbH, Dortmund, Fed. Rep. of Germany

[21] Appl. No.: 249,654

[22] Filed: Mar. 31, 1981

[30] Foreign Application Priority Data

Apr. 13, 1980 [DE] Fed. Rep. of Germany ....... 3013027

[51] Int. Cl.³ .............................................. G01F 3/14
[52] U.S. Cl. .................................. 73/861.21; 73/252
[58] Field of Search .............................. 73/252, 861.21

[56] References Cited

U.S. PATENT DOCUMENTS

| | | | |
|---|---|---|---|
| 4,078,429 | 3/1978 | Yokota et al. | 73/252 |
| 4,089,221 | 5/1978 | Yokota | 73/252 |

FOREIGN PATENT DOCUMENTS 52-33763  3/1977  Japan ..................................... 73/252

Primary Examiner—Howard A. Birmiel

Attorney, Agent, or Firm—Wilson, Fraser, Barker & Clemens

[57] ABSTRACT

This invention relates to a device for measuring solids in a moving stream installed in a closed system in which the prevailing pressure therein is equal to or higher than the ambient pressure. The device includes an inlet which is smaller in cross-section than a main portion of the housing for providing a solid free internal volume vertically downwardly of the inlet. A diverter member rotatable about a horizontally disposed axis is disposed in the housing portion and has a length greater than the width of the housing so as to permit the upper edge of the diverter member to swing outside the flow of solids into the main portion of the housing while the lower edge of the diverter contacts the opposite wall of the housing for dividing the main portion of the housing into two spaces. The center of gravity of the diverter member is located above the axis of rotation so as to permit solids to fill one space between the diverter member and the housing until a weight of the solids material imparts an opposite rotary motion upon the diverter member for producing another space to be filled. Position sensing means is provided for signalling the position of the diverter member within the housing for indicating which space is being filled.

8 Claims, 8 Drawing Figures

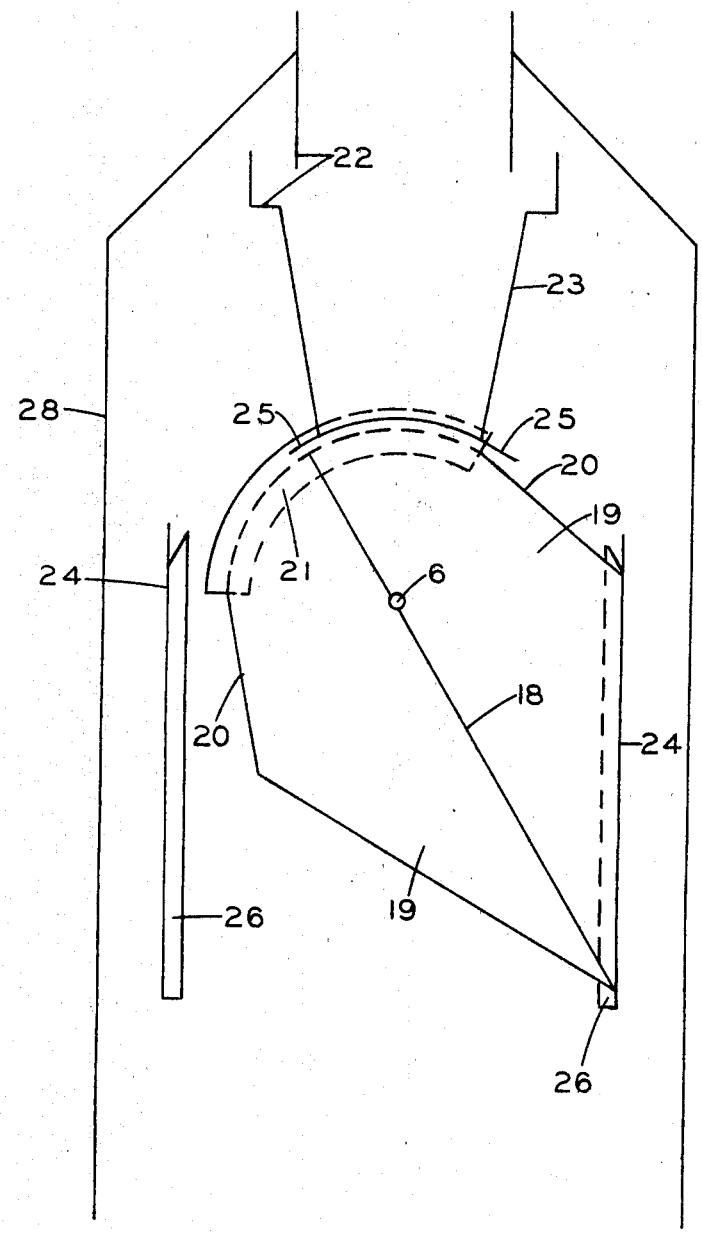
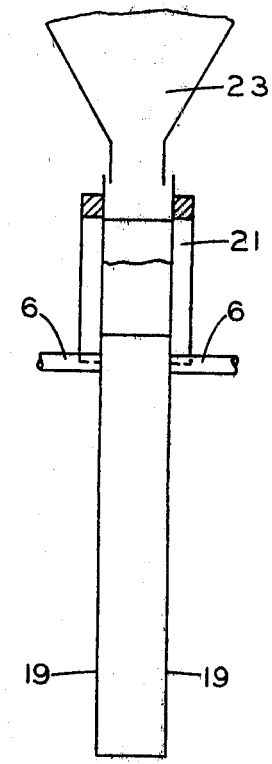
FIG. 7
FIG. 8

DEVICE FOR MEASURING SOLIDS IN A MOVING STREAM

BACKGROUND OF THE INVENTION

A number of processes require the measurement and control of the movement of flowable solids particles.

Many processes are known in which the starting material or the product consists of solids which may be present in the form of a stream of solid particles of approximately the same structure, the same composition and/or shape, or of a mixture of such particles. More specifically, such materials may be defined, for example, as lumps, broken lumps, stone chips, grains, compacts, pellets, pills, extrudates, salt-like substances, dusts, powders, etc.

The fluidized-bed technology involves starting materials, products, and/or catalysts in the form of fine-grain solid materials. The fluidized-bed drying of bulk materials or the gassification of pulverized coal with oxygen by fluidized-bed method (Winkler process) may be cited in this connection. Another example is the fluidized-bed firing in thermal power stations where pulverized coal is burned in the presence of lime-bearing granular materials. Fluid-bed catalytic processes are the state of the art in petroleum refining technology.

All these processes involve the handling of streams of flowable solid materials, wherein the streams require measurement and control. The material is frequently subject to pressure. The pressure may be the static pressure of a column of flowable solids above the measuring point, or the dynamic pressure of a flowing stream of solids which may be subject to transformation into a static pressure at points of restriction, or the pressure of a liquid or gas entrained in the flowing stream of solid materials. The flowing stream to be measured is sometimes at an elevated temperature, for example, several hundred degrees centigrade, which requires an enclosure to avoid heat dissipation.

In many cases, there are other reasons to prevent any contact of material and/or the entrained liquid or gas with the atmosphere or with any other ambient substance. Certain solids are pyrophorous when being contacted with air at ambient temperature. The entrained gas may be inflammable or toxic.

A number of methods are known for measuring such flowing streams of solids in closed systems.

The streams of solids may be measured by means of a liquid-embedded gate which is opened by the force of the flowing material against the force of a counter weight or spring. This method is subject to substantial inaccuracies which depend, among other factors, on the grain size distribution of the granular or lumpy material.

Bucket wheels are suitable for feeding and metering but do not lend themselves to measuring flowing streams of solids. The same applies to pairs of gear wheels (reversible of the gear pump principle). Flowability of the solids is generally insufficient to impart rotary motion to the wheels.

For the counting and sorting of solids unit quantities of the same shape, for example, pills, pellets, compacts, use is made of horizontal discs which are provided with circumferential cavities for accommodating one unit quantity each. These devices have the disadvantage that different shapes and sizes of the unit quantities are bound to cause difficulties and that the unit quantities must have a certain definite shape.

Measurement is frequently performed with the aid of a set of locks. This system comprises one or several receivers connected in parallel with their associated upstream and downstream shut-off devices. One receiver is filled to a certain definite level with the outlet in the closed position. It is then emptied while the inlet is closed. Several receivers connected in parallel may be operated intermittently. The receiver may rest on rubber supports or springs and may be connected through expansion joints to the other structural elements of the system. The weight of the processed material can be measured directly through the deformation of the rubber supports or springs.

The lock system permits measuring of the volume and/or weight of the solids in the flowing stream under pressure and exclusion of air. Intermittent operation is a disadvantage of this system. In addition, it requires voluminous equipment comprising vessels, valves, interconnecting piping, distributors, control facilities, etc. For certain streams of solids, it involves the risk of the material being inadmissibly crushed between elements of the shut-off devices. The use of expansion joints limits the pressure and temperature levels.

SUMMARY OF THE INVENTION

The object of the invention is to eliminate the disadvantages described above and permit measurement under pressure and exclusion of air.

The problem is solved by providing a housing having an inlet which is smaller than the main housing portion so that a solids-free internal volume remains available; a diverter member rotatable about a horizontal axis within the housing having a length exceeding the diameter of the housing and a center of gravity located above the axis of rotation, wherein the upper edge of the diverter member is adapted to alternatively contact one wall of the housing and the lower edge of the diverter member is adapted to contact the opposite wall of the housing; position sensing means for sensing and transforming into an electric signal, the position of the diverter member; and a shaft for rotatingly supporting the diverter member to permit alternating motion of the diverter member.

The measuring device provided according to the invention has the particular advantage that it permits measuring flowable solids in a moving stream such that the stream need not be split into separate streams, involves no pressure drops or the formation of turbulence therein, and that no force acts upon the associated diverter member which would move it into the flow of the material being measured.

Operation is virtually continuous and the equipment needs are held at a minimum.

BRIEF DESCRIPTION OF THE DRAWINGS

Several embodiments of the invention are described below and explained with the aid of the accompanying drawings, in which:

FIGS. 7 and 8 show another embodiment of the invention wherein the measuring device is provided with an articulated double chamber.

DESCRIPTION OF THE PREFERRED EMBODIMENT

Figure 1:
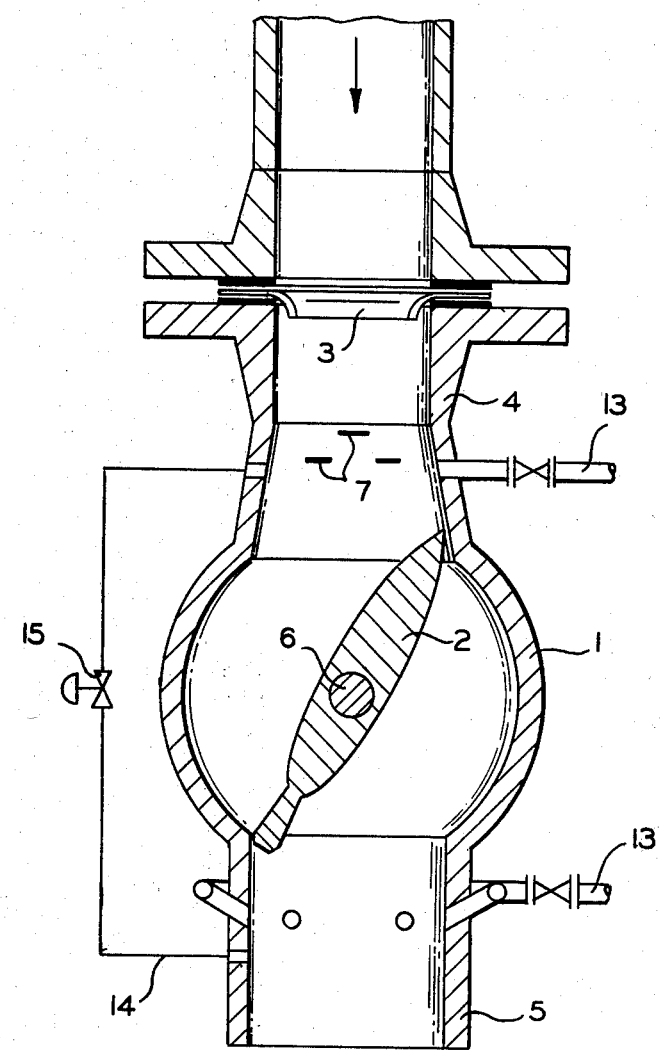
FIG. 1 is a vertical sectional view of a measuring device incorporating the features of the invention.

Referring to FIG. 1, the device according to the invention comprises a housing 1 which includes a pivotally mounted diverter member 2. The housing 1 includes a main housing portion which is larger in cross-section than an inlet that is located vertically above the main portion of the housing 1. The diverter member 2 is pivotally mounted in the main housing portion in a manner to divide the main housing portion into two spaces as will be described hereinafter. The process material passes from a pipe through a planar or conical restriction orifice plate 3 into a transition section 4 having a generally circular cross-section extending into a rectangular cross-section. The entire upper edge of the diverter member 2 is adapted to contact the inner wall of the rectangular section of the transition section 4 and covers it completely. The process material is caused to flow into the left-hand space between the housing 1 and the diverter member 2 and starts filling this space until a weight of the solids material therein imparts a counterclockwise rotary motion upon the diverter member 2. After the rotational movement of the diverter member is effected, the upper edge of the diverter member 2 then contacts the left-hand inner wall of the section 4, and further material passes into the right-hand space between the housing 1 and the diverter member 2. The outlet duct 5 which terminates in a tubular cross-section which is larger than that of the inlet of the housing 1 in order to insure unobstructed discharge of the material passing therethrough.

The diverter member 2 and the housing 1 are shaped so that the lower edge of the diverter member 2 just closes the outlet duct 5 when its upper edge contacts one of the inner walls of the section 4.

The diverter member 2 is mounted to rotate with a shaft 6. The center of gravity of the diverter member 2 is located above the centerline of the shaft 6 so that the weight of the diverter member causes it to normally rest with the upper edge thereof in contact with one or the other inner side of the transition section 4.

In order to reduce the breaking force produced by the process material and the opposing motion of the diverter member 2, the latter may be provided with a sharp edge on both longitudinal sides. The fluid entrained by the solid material may be subject to small pressure difference across the diverter member 2 which may be utilized for clearing the gap between the diverter member 2 and the housing 1.

Impingement baffles 7 are provided within the transition section 4 to prevent the impact of a stream of concentrated solids upon the diverter member 2 which might affect a floating motion of the diverter member and cause incorrect instrument readings.

Figure 2:
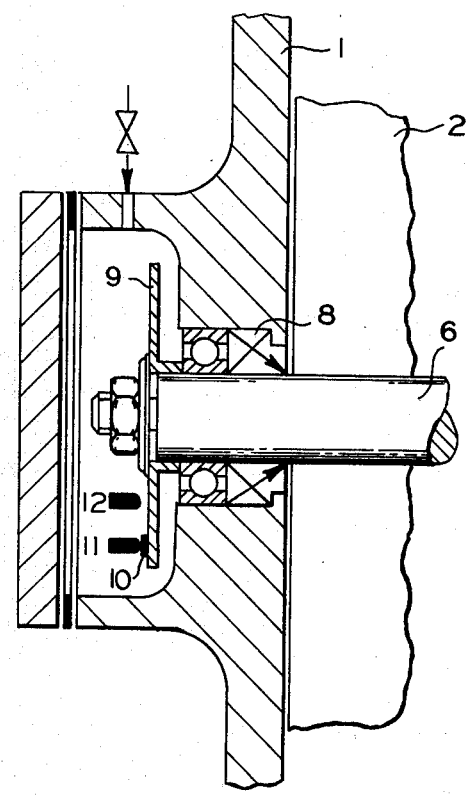
FIGS. 2 to 5 show various elements illustrated in FIG. 1 including the shaft passage and contact disc position.

Referring to FIG. 2, the shaft 6 extends through a sealing element 8 on both sides of the diverter member and is rotatingly supported in suitable bearing means in the wall of the housing 1. The sealing element 8 may consist of sealing rings or packings of flexible material which are insensitive to torsional stresses. The torsional force favors the operation of the diverter member 2 similar to the balance of a watch, unless it is excessive. The sealing elements prevent process material from penetrating into the associated shaft bearings. If sealing rings are used, a flushing medium (gas or liquid) may be admitted through a feed connection. The flushing medium should penetrate through the sealing rings to the diverter member 2. In this way, the passage of the shaft 6 through the sealing elements 8 will be held free of process material despite the gap between the shaft 6 and the sealing element 8 so that unobstructed rotational movement of the diverter member is insured.

Another embodiment of the invention provides for supporting the diverter member 2 on stationary centers, for example, which extend into the housing for being accommodated by the center bearings of the diverter member 2. The center bearings may be installed within the diverter member 2. Between the diverter member and the stationary centers, provision may be made for sealing elements which prevent the penetration of process material into the bearings. Steel prisms may also be used instead of centers for supporting the diverter member 2.

Figure 3:
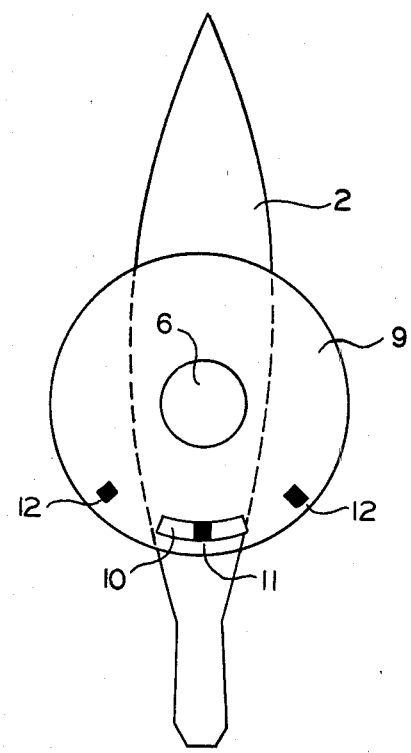
Figure 4:
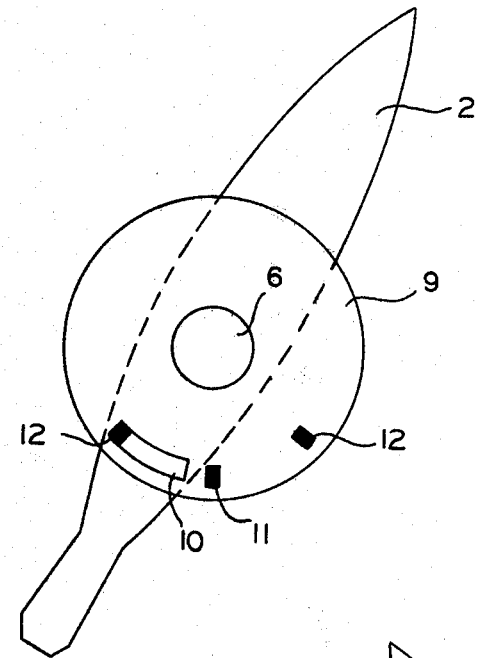
Figure 5:
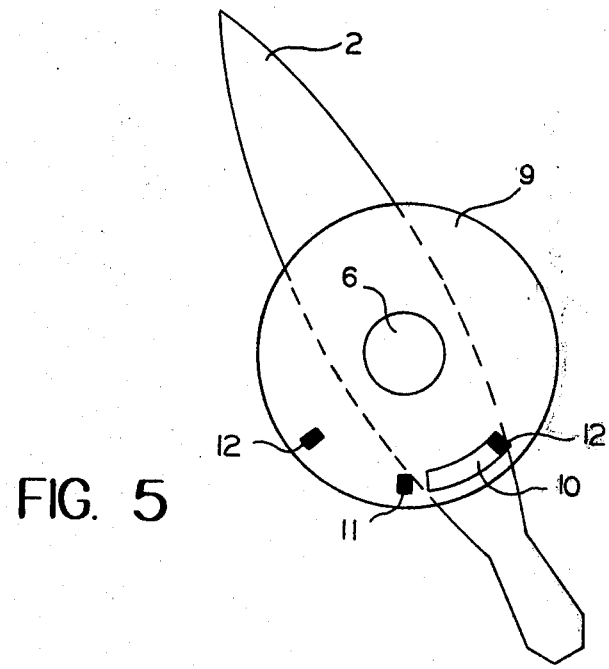

Referring to FIG. 2, the end of the shaft 6 is adapted to carry a contact disc 9 with a contact track 10 on which slides a contact 11. The contact disc 9 rotates with the shaft 6. When the diverter member 2 is in one of its end positions, the contact 11 does not engage the contact track 10. FIGS. 3, 4, and 5 show various operating positions of the measuring device. As soon as the diverter member 2 starts rotating by the weight of the process material, the contact track 10 will engage the contact 11. This feature is utilized for two purposes:

(1) An electric, mechanical, pneumatic, hydraulic, or other appliance (not shown) is actuated to turn the shaft 6 with the diverter member 2 fully into the specific end position. This appliance may consist of an electric motor connected to the shaft 6, of a linkage operated by electromagnets, of installed electromagnets, or similar mechanisms.

(2) The energy impulse required for operating the appliance is utilized for moving a counting mechanism (not shown) to the next figure.

In addition, two contacts 12 may be provided which engage the contact track 10 when the diverter member 2 is in its end position. A lamp (not shown) is connected to each of these contacts 12 to indicate externally the momentary position of the diverter member 2. The counting mechanism can also be actuated through these end position indicators. The motion of the diverter member 2 can also be transferred mechanically, or in any other way to the counting mechanism.

Morover, provision may be made for a press button (not shown) which can be actuated to move the diverter member 2 through the mechanism into the next position of its operating sequence. This permits performing a functional check and applying an external force if the diverter member 2 is obstructed in some way to militate against the free turning by excessive friction.

The transition section 4 and the outlet duct 5 are provided with connections 13 for admitting a flushing medium (gas or liquid). The connection 13 above the diverter member 2 is intended to vent the space above the diverter member. The upper part of the diverter member 2 shall be surrounded by flushing medium and not by solids. The lower connection 13 permits the injection of a flushing medium to facilitate discharge of the solids being measured.

Figure 6:
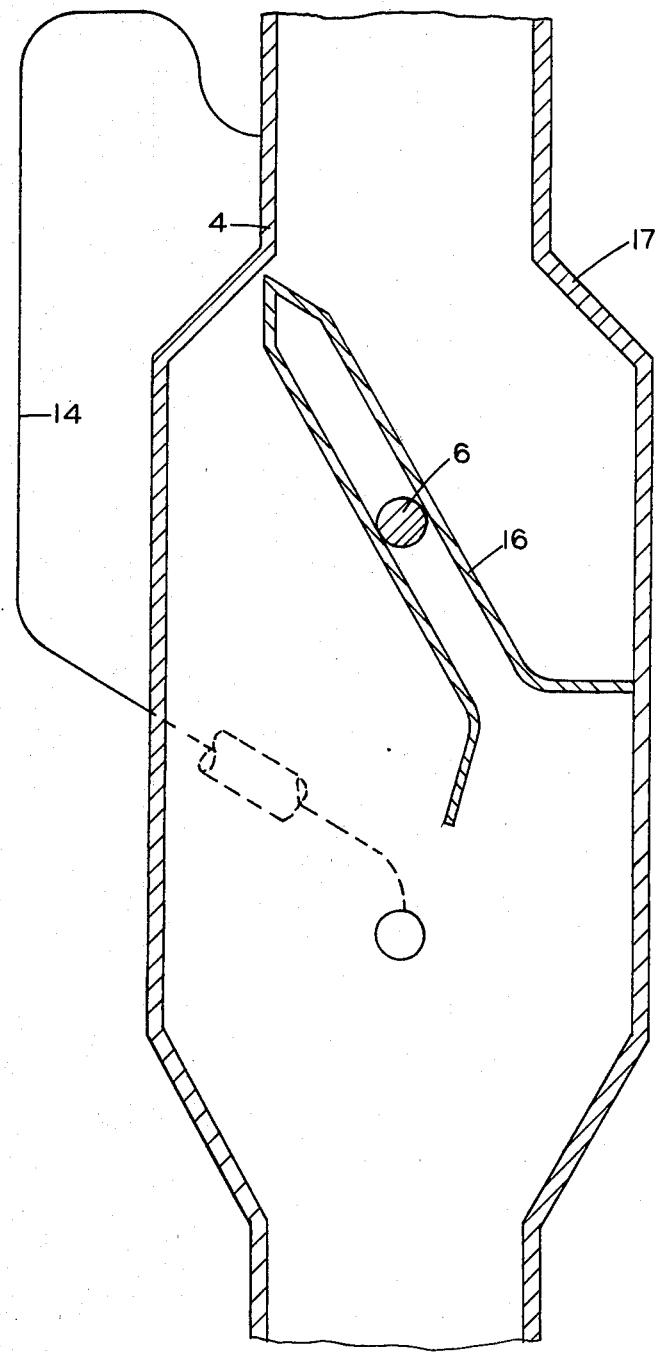
FIG. 6 shows a modified form of a measuring device incorporating the features of the invention provided with a diverter member of a fish-tail shape.

In addition to being connected to the housing 1, the section 4 and the outlet duct 5 can be connected through a bypass 14 which comprises a spill valve 15 controlled by differential pressure. If a pressure differential across the diverter member 2 is undesirable, the spill valve 15 of the bypass 14 may be omitted as shown in FIG. 6. Special design features may be provided to prevent solids from being entrained into the bypass 14. This can be achieved, for example, by providing a steep upward angle for the inlet and outlet of the bypass 14 so that any entrained material drops backward. In this case, the flow velocity of the gas or liquid entering the bypass 14 must be adjusted to low levels. The inlet and outlet are then connected through a U-shaped pipe. The installation of filters on the inlet and outlet may also be provided.

The counting mechanism (not shown) referred to above, counts the number of motions of the diverter member 2. The switching interval will be approximately one second, for example. The counting mechanism emits, every 15 seconds, for example, a signal to indicate the number of motions performed during that period. This signal can be transferred to a dotted-line recorder or can be compared with a set-point value for control purposes. Other mechanisms are imaginable which convert the diverter member motion into an instantaneous value.

By modifying the shape and weight (hollow body, holes) and the material of construction (specific weight) of the diverter member 2, its structural design can be adjusted to meet the requirements of the solids to be measured. The measuring device can also be designed to provide for a circular, elliptical, or oval shape of the diverter member instead of the generally rectangular shape. The shape of the diverter member and of the associated housing can be adapted to operational conditions.

In another embodiment of the invention which is illustrated in FIG. 6, the lower part of a diverter member 16 is extended in comparison with the diverter member 2 of FIG. 1. The center of gravity of the diverter member remains, however, above the associated shaft 6. This design permits the accumulation of more solid material above the diverter member 16 so that a higher torque can be developed for the rotational movement of the diverter member. The lower end of the diverter member 16 may have the shape of a planar plate or may have a fish-tail shape, as shown in FIG. 6. This shape facilitates the sealing against the inner surface of the housing 17. In addition, the solids flow leaving the chamber to be emptied in parts in annular momentum upon the diverter member 16 because of the shovel-like construction of its lower ends. The fish-tail end is shaped to insure that it is completely empty each time.

A shape of the housing 17 is adapted to the modified design of the diverter member 16 in that the lower part of the housing has been enlarged as compared to the housing illustrated in FIG. 1. The vertical walls in the lower part of the housing 17 permit a full-face contact with the lower edge of the diverter member 16 and prevents incomplete emptying of the chambers.

For applying more elevated pressures, the planar walls of the housing 17 can be re-enforced by known methods. As compared to the FIG. 1, the transition section 4 and the upper part of the housing 17 can be narrowed and differently shaped so that the upper edge of the diverter member 16 is located outside the inlet cross-section. This design reduces the rate of leakage and insures a smooth fit between the inner wall and the lower edge of the diverter member.

The invention, as described above, is primarily intended for use in connection with air-pressure conveying in the feed and discharge lines of an associated plant. The solid material occupies the full cross-sectional area of the line and entrains the aerating fluid in the form of bubbles or passes countercurrently to the bubbling aerating fluid. However, the device according to the invention can also be applied to flow conditions involving solids flows through inclined inlet and outlet lines whose cross-sectional area is not fully occupied by the material and results in the material occupying only the lower part of the cross-sectional area, while a separate stationary or mobile phase of gas or liquid is present in the upper part. In either case, the restriction orifice plate 3, illustrated in FIG. 1, insures the same flow condition of the solids material at the inlet of the measuring device. Equalization of the gas or liquid pressure is achieved through the bypass 14 which, for this purpose, can also be connected above the restriction orifice plate 3. Moreover, the bypass connection may be located on top of the inclined inlet and outlet lines.

As described above, the fluid can penetrate not only through the bypass 14, but also through the structural gaps, for example, between the housing 17 and the diverter member 2, to flush them clear of solid material, which contributes to an unobstructed motion of the diverter member.

The device according to the invention can also be used when the solid material is in a fluidized state. In the inlet and the outlet lines, the flow rate of the gas and liquid passing concurrently to the downward flow of the solid material may be adjusted, for example, so that the solid particles descend in a fluidized state. In this case, the bypass 14 in the lower part of the measuring device must be connected to a point where the flow of velocity of the gas or liquid is low enough to insure that the solid particles are subject only to a weak lifting force so that the fluid separates from the solids material. In the upper part of the measuring device, the fluid must be admitted to the countercurrent solids flow for which purpose a belt of nozzles may be provided, for example. In this case, the restriction orifice plate 3 and/or the impingement baffles 7 might be omitted. It may be necessary to make provision for a settling chamber to collect the descending solid material between fluid entry of the solid flow and the restriction orifice plate 3 or the impingement baffles or the diverter member 2.

FIGS. 7 and 8 show another embodiment of the invention wherein the measuring device consists of a diverter member 18, two cover plates 19, and two connecting walls 20. The diverter member 18 is designed as a planar plate. Shafts 6 are mounted externally on the cover plates 19. In order to obtain an overall center of gravity located above the axis of rotation, weights are attached externally to the cover plate 19. FIG. 7 shows the design intended for handling a solids flow passing from top to bottom and a countercurrent flow of aerating fluid. After passing through the fluid admix section 22, the solid material drops through a conical settling chamber 23 into the diverter member 18 whose lower part contacts a stop plate 24 which closes the lower right-hand opening of the diverter member 18. At the same time, the other measuring chamber of the diverter member 18 is open to the bottom end so that the solid material may drop out. The diverter member knocks hard against respective stop plates 24 to cause disengagement of the solid material in the chamber which is open at the bottom, at that time. While the accumulated solid material leaves a chamber at the bottom end, suction is taken through the upper openings of the measuring chamber to withdraw solid material from the surrounding fluid. This opening is covered partly or wholly by a plate 25. After passing, the diverter member, the solid material passes across a zone of large cross-sectional area where a countercurrent stream of fluid can separate from the solids material while both streams may form a fluidizing or pulsating bed in the bottom outlet. To facilitate the closing of the measuring chamber opening, the diverter member 18, the stop plates 24 and/or the conical sections 23 are provided with plates 25 to form labyrinth-like sealing elements 26. The space surrounding the diverter member can be sized to insure a low listing speed of a fluid passing countercurrently to the solids material in the inlet and outlet lines so that the fluid-borne solid material may descend in and below the area of the diverter member.

The surrounding housing 28 may be shaped to any cross-section. A round cross-section is preferred for high internal pressure and temperature levels. If the torque produced by the center of gravity is not sufficient to hold the diverter member 2 in its end position, an external force (not shown) may be applied for this purpose. This force may originate, for example, from the system described before which moves the diverter member 2 into the other end position, either after commencement of the rotary motion, or upon a signal from a level sensing element.

We claim:

1. A measuring device for measuring solids of a moving stream in a closed system in which the prevailing pressure is equal to or higher than atmospheric pressure, comprising:
   a. a housing having a portion larger than a vertically disposed inlet opening located above said larger portion so that a solid-free internal volume remains available adjacent the inlet opening;
   b. a diverter member rotatable about a horizontal axis within said housing, the length of said diverter member exceeding the width of the housing and having a center of gravity located above the axis of rotation wherein the upper edge of the diverter member is adapted to be alternately positioned outside the flow of solids adjacent one wall of said housing and the lower edge of said diverter member is adapted to contact the opposite wall of said housing; and
   c. position sensing means for sensing and transforming the rotational movement of said diverter member into an output signal.

2. A measuring device according to claim 1 including a shaft on which said diverter member is mounted; said shaft having at least one end which passes through the wall of said housing; and means carried by said shaft end for effecting rotation of said shaft and said diverter member.

3. A measuring device according to claim 1 wherein the lower part of said diverter member is longer than its upper part and adjacent the wall of said housing and the upper edge of said diverter member in its end position is located closer to the axis of symmetry of said housing than the point of contact between the housing wall and the lower part of said diverter member.

4. A measuring device according to claim 1 wherein the lower part of said diverter member has a fish-tail shape so that the upper leg in the end position of said diverter member contacts the wall of said housing at a smaller angle as compared to said diverter member position.

5. A measuring device according to claim 1 wherein said diverter member includes an articulated double chamber having a partition wall, cover plates, and connecting walls; and stop plates adapted to cooperate with and selectively close said articulated double chamber.

6. A measuring device according to claim 1 wherein the inlet of the measuring device above said diverter member comprises a restriction orifice plate and at least one impingement baffle.

7. A measuring device according to claim 1 including a by-pass line to carry a fluid passing counter-currently to the solid flow and adapted to provide communication between the solid flow ducts upstream and downstream of a measuring device.

8. A measuring device according to claim 1 including level indicators and means producing a force controlled by said level indicators for holding and moving said diverter member between its alternate housing contacting position.

* * * * *